(12) United States Patent
Hall et al.

(10) Patent No.: US 11,058,522 B2
(45) Date of Patent: Jul. 13, 2021

(54) DENTAL IMPLANT

(71) Applicant: NOBEL BIOCARE SERVICES AG, Kloten (CH)

(72) Inventors: Jan Hall, Gothenburg (SE); Stefan Lundgren, Umeå (SE); Göran Bergman, Gothenburg (SE); Fredrik Kullberg, Lycke (SE)

(73) Assignee: Nobel Biocare Services AG, Kloten (CH)

( * ) Notice: Subject to any disclaimer, the term of this patent is extended or adjusted under 35 U.S.C. 154(b) by 0 days.

(21) Appl. No.: 15/123,573

(22) PCT Filed: Mar. 5, 2015

(86) PCT No.: PCT/EP2015/054591
§ 371 (c)(1),
(2) Date: Sep. 2, 2016

(87) PCT Pub. No.: WO2015/132331
PCT Pub. Date: Sep. 11, 2015

(65) Prior Publication Data
US 2017/0071703 A1    Mar. 16, 2017

(30) Foreign Application Priority Data
Mar. 7, 2014    (GB) .................................... 1404047

(51) Int. Cl.
*A61C 8/00*     (2006.01)
(52) U.S. Cl.
CPC .......... *A61C 8/0022* (2013.01); *A61C 8/0092* (2013.01)

(58) Field of Classification Search
CPC ... A61C 8/0022; A61C 8/0092; A61C 8/0025; A61C 8/0021; A61C 8/0024;
(Continued)

(56) References Cited

U.S. PATENT DOCUMENTS

| | | | |
|---|---|---|---|
| 4,697,969 A | 10/1987 | Sparkes | |
| 4,871,313 A | 10/1989 | Maillefer | |

(Continued)

FOREIGN PATENT DOCUMENTS

| | | |
|---|---|---|
| CN | 102697570 A | 10/2012 |
| CN | 103271774 | 9/2013 |

(Continued)

OTHER PUBLICATIONS

International Search Report for Application No. PCT/EP2015/054591 dated May 26, 2016 in 3 pages [the ISR for the PCT Application of this US national phase application].

*Primary Examiner* — Heidi M Eide
(74) *Attorney, Agent, or Firm* — Knobbe, Martens, Olson & Bear, LLP

(57) ABSTRACT

The present invention discloses a dental implant (30; 130; 230; 330; 430) for preserving soft tissue and promoting bone growth, including an elongated implant body having a coronal end portion (31; 131; 431) and an apical end portion (32; 132; 332; 432); an external thread (40; 140; 240; 440); a flute arrangement (50; 150; 350; 450) having at least one helical flute having a depth; in which the apical end portion forms a blunt tip (39; 139; 339), and in which the helical flute spirals in opposite direction to the external thread, and the flute exits on the face of the blunt tip.

29 Claims, 11 Drawing Sheets

(58) Field of Classification Search
CPC .... F16B 25/103; F16B 25/0015; A61B 17/86; A61B 17/8625; A61B 17/863
USPC .................. 411/386, 387.1, 387.6–387.8
See application file for complete search history.

(56) References Cited

U.S. PATENT DOCUMENTS

| | | | |
|---|---|---|---|
| 5,601,429 A | 2/1997 | Blacklock | |
| 5,628,630 A | 5/1997 | Misch | |
| 5,667,348 A | 9/1997 | Chen et al. | |
| 5,759,003 A | 6/1998 | Greenway et al. | |
| 5,772,374 A | 6/1998 | Ide et al. | |
| 5,891,146 A * | 4/1999 | Simon | A61B 17/863 411/414 |
| 5,897,319 A | 4/1999 | Wagner et al. | |
| 5,902,109 A | 5/1999 | Reams et al. | |
| 6,135,772 A | 10/2000 | Jones | |
| 6,273,722 B1 | 8/2001 | Phillips | |
| 6,312,472 B1 | 11/2001 | Hall et al. | |
| 6,382,976 B1 | 5/2002 | Wagner | |
| 6,402,515 B1 | 6/2002 | Palti et al. | |
| 6,419,708 B1 | 6/2002 | Hall et al. | |
| 6,450,748 B1 | 9/2002 | Hsu | |
| 6,604,945 B1 | 8/2003 | Jones | |
| 6,679,701 B1 | 1/2004 | Blacklock | |
| 6,730,129 B1 | 5/2004 | Hall | |
| 6,918,766 B1 | 7/2005 | Hall et al. | |
| 7,008,226 B2 | 3/2006 | Mayer et al. | |
| 7,048,541 B2 | 5/2006 | Hall et al. | |
| 7,281,925 B2 | 10/2007 | Hall | |
| 7,491,058 B2 | 2/2009 | Jorneus | |
| 7,597,557 B2 | 10/2009 | Fromovich et al. | |
| 7,699,881 B2 | 4/2010 | Willmann | |
| 7,708,558 B1 | 5/2010 | Hall et al. | |
| 7,713,292 B2 | 5/2010 | Biedermann et al. | |
| 7,713,307 B1 | 5/2010 | Hall et al. | |
| 7,806,693 B2 | 10/2010 | Hurson | |
| 8,016,593 B2 | 9/2011 | Hall | |
| 8,038,442 B2 | 10/2011 | Hurson | |
| 8,100,985 B2 | 1/2012 | Hall | |
| 8,113,834 B2 | 2/2012 | Hall | |
| 8,152,856 B2 | 4/2012 | Hall et al. | |
| 8,167,618 B2 | 5/2012 | Hall | |
| 8,349,009 B2 | 1/2013 | Hall et al. | |
| 8,439,919 B2 | 5/2013 | Hall | |
| 8,657,601 B2 | 2/2014 | Hall | |
| 8,764,443 B2 | 7/2014 | Hall | |
| 8,771,361 B2 | 7/2014 | Hall | |
| 8,827,703 B2 | 9/2014 | Hall | |
| 2002/0182567 A1* | 12/2002 | Hurson | A61C 8/0006 433/173 |
| 2003/0228556 A1* | 12/2003 | Giorno | A61C 8/0022 433/174 |
| 2004/0121289 A1* | 6/2004 | Miller | A61C 8/0022 433/174 |
| 2005/0221258 A1 | 10/2005 | Hall | |
| 2008/0032264 A1 | 2/2008 | Hall | |
| 2008/0227057 A1* | 9/2008 | Anitua Aldecoa | A61C 8/0001 433/174 |
| 2008/0261175 A1* | 10/2008 | Hurson | A61C 8/0022 433/173 |
| 2009/0258328 A1 | 10/2009 | Chen | |
| 2010/0009316 A1 | 1/2010 | Hurson | |
| 2010/0055643 A1* | 3/2010 | Hung | A61C 8/0018 433/174 |
| 2010/0112519 A1 | 5/2010 | Hall et al. | |
| 2010/0190138 A1 | 7/2010 | Giorno | |
| 2011/0033826 A1 | 2/2011 | Chen | |
| 2011/0294094 A1* | 12/2011 | Moshavi | A61C 8/0022 433/174 |
| 2012/0015325 A1* | 1/2012 | Chen | A61C 8/0037 433/174 |
| 2012/0225407 A1* | 9/2012 | Chen | A61C 8/0037 433/174 |
| 2013/0022942 A1 | 1/2013 | Zadeh | |
| 2013/0045462 A1 | 2/2013 | Tzeng | |
| 2013/0224687 A1 | 8/2013 | Karmon | |
| 2013/0273500 A1 | 10/2013 | Giorno | |
| 2014/0023990 A1 | 1/2014 | Zadeh | |
| 2014/0045144 A1 | 2/2014 | Dukhan | |
| 2015/0215696 A1* | 7/2015 | Bjorn | H04R 25/606 600/25 |

FOREIGN PATENT DOCUMENTS

| | | |
|---|---|---|
| CN | 103271774 A | 9/2013 |
| DE | 10 2006 013 456 A1 | 9/2007 |
| EP | 1030622 A2 | 2/2006 |
| EP | 2095790 A2 | 9/2009 |
| EP | 2377490 A2 | 10/2011 |
| EP | 2377491 A2 | 10/2011 |
| EP | 2392289 A1 | 12/2011 |
| EP | 2656813 A2 | 10/2013 |
| JP | H6-319759 | 11/1994 |
| JP | 2006212449 | 8/2006 |
| RO | 110899 B1 | 5/1996 |
| WO | WO 2004/058091 A1 | 7/2004 |
| WO | WO2010/108794 | 9/2010 |
| WO | WO 2013/157756 A1 | 10/2013 |
| WO | WO 2014/026706 A1 | 2/2014 |
| WO | WO 2015/118543 A1 | 8/2015 |
| WO | WO 2015/125139 A2 | 8/2015 |

* cited by examiner

DENTAL IMPLANT

CROSS-REFERENCE TO RELATED APPLICATIONS

This application is a national stage application under 35 U.S.C. § 371 of International Application No. PCT/EP2015/054591, filed on Mar. 5, 2015, which published in English as WO 2015/132331 A1 on Sep. 11, 2015, and which claims priority benefit of GB Patent Application No. 1404047.1, filed on Mar. 7, 2014.

BACKGROUND OF THE INVENTION

The present invention relates to a dental implant for preserving soft tissue, promoting bone growth and bone augmentation. The invention further relates to an implant system and a method for implanting said implant.

STATE OF THE ART

An increasing share of patients is asking for an implant-supported tooth or an implant-supported denture instead of traditional prostheses. This is a result of the ongoing progress and improvements of dental implants as well as the methods needed to achieve an implantation that provides the desired biomechanical and biological properties at the implantation site. By now, dental implants are able to provide a long lasting solution not only in terms of function but also in terms of aesthetics.

The increasing demand for these dental replacements drives this field of technology to also develop new and better solutions for patients that may need a more advanced treatment to achieve the desired results. One of the most important factors for a favorable outcome of an implantation is bone quantity and quality that can be relied on for anchoring the implant.

In general, the width of the alveolar ridge or alveolar arch changes from being rather narrow for the central teeth to be relatively wide at the location of the molar teeth. Further, there are significant differences between the amount of bone tissue available beneath the cortical layer of the alveolar ridge that is applicable for implantation. In this respect, the mandible often provides sufficient bone quantity and quality for implantation of an implant so that the forces transferred from the prosthetic tooth can be carried on into the alveolar bone to achieve high short and long term stability for the implant.

On the other hand, the maxilla may have less bone quality and quantity to offer for anchoring an implant. In particular, the alveolar bone at the posterior maxilla has a reduced height due to the maxillary sinus. Nonetheless, in this section of the maxilla, sufficient stability has to be achieved for anchoring an endosseous implant.

Up to now, there have mainly been two independent approaches to attack this problem. The first approach relies on augmentation of the bone tissue using surgical techniques, wherein the second one concentrates on adapting the design of the implant. For the latter, it is for example possible to change the dimensions of the features of an implant such as the dimensions or the implant's surface in order to stimulate osseointegration. A successful example of a surface that demonstrated a positive effect on osseointegration is the TiUnite® surface developed and marketed by Nobel Biocare®.

Concerning bone augmentation, there are numerous techniques suggested by the prior art. These techniques are based on the introduction of graft material from different sources. Examples of graft materials used for augmenting the sinus floor are Autografts, Allografts, Xenografts and Alloplasts. It has been shown that these materials have in general a high survival rate once being implanted (see Jensen, O. T.; "Report of the Sinus Consensus Conference of 1996"; Int J Oral Maxillofac Implants. 1998; 13 Suppl: 11-45. Review). However, Autografts require additional surgery, inflicting pain and additional risks for the patient not only at the explantation site and/or have a limited availability. With Allografts, Xenografts and Alloplasts there is always a residual risk remaining associated with the body being exposed to exogenic material. Further, the long term results of most of these materials in terms of their potential in remodeling and adaptation of the bone tissue to external loads is still not fully understood.

More recently, a one-step surgical technique has been developed that utilizes a window in the lateral cortical wall of the maxillary sinus. After accessing the sinus through this window, a space is created between the sinus and the mucous membrane by lifting the latter and holding it in position by inserting periosteal elevators. Following this step, dental implants (TiUnite, Mk III, Branemark System, Nobel Biocare AB, Gothenburg, Sweden) are inserted into the alveolar ridge taking the position of the periosteal elevators that are subsequently removed prior closing the window (Lundgren, S. et al.; "Bone Reformation with Sinus Membrane Elevation: A New Surgical Technique for Maxillary Sinus Floor Augmentation"; Clin Implant Dent Relat Res. 2004; 6(3): 165-73).

In order to take this surgical technique one step further, an integrated approach has been developed. This approach extends beyond a simple combination of the two aforementioned ways to provide stability to a dental implant in the posterior region of the maxilla by taking said technique for the design of an implant into account (see WO 2004/010891 A1).

More specifically, the intermediate implant in WO 2004/010891 A1 is designed to prevent rupture of the mucous membrane while keeping it at a distance to the alveolar bone tissue until the predetermined amount of callus has been formed in the maxillary sinus. This callus will calcify and thus be transformed into bone tissue to provide a higher volume of bone to carry the loads acting on the implant. In addition, the implant carries growth stimulating substances that are known to stimulate the formation of bone tissue. However, these substances incur high costs, not only due to their production but also due to their limited shelf live. Moreover, since they are directly in contact with blood, they have the potential to act systemically and are therefore subject to extensive regulations.

Thus, there is a need for an implant that based on the previously mentioned augmentation technique to increase bone mass in the maxilla also provides the option to apply less invasive surgical techniques. Further it is desired to develop an implant that is able to stimulate bone growth and does not inflict unnecessary or counterproductive damage to tissue, in particular to the mucous membrane.

In this respect, U.S. Pat. No. 6,604,945 B1 discloses a method and apparatus for embedding an implant in a way that encourages bone tissue growth in and around the implant. This is intended to be achieved by a bone-fragment collecting drill. The collected bone fragments are packed into helical channels and through holes prior the installation of the implant in the implantation hole. The bone material used for augmentation is autologous and the collection of bone material still has to be performed during steps that precede the insertion of the implant.

U.S. Pat. No. 6,273,722 B1 discloses a dental implant having a body with a diameter that is press fit into a hole drilled into a patient's jaw bone, and having a helical groove machined into the body diameter to improve the rate of growth of bone tissue to securely lock the implant in position. A shallow height oppositely wound helical thread may be added to increase the holding force upon initial fitting of the implant. None the less, the implant of US '722 is a press fit implant, i. e. an implantation hole with precise diameter has to be prepared. In contrast to US '945, the bone tissue taken out to create said hole is completely lost.

SUMMARY OF THE INVENTION

An implant, an implant system as well as a method for implantation said implant is defined in the hereto attached independent claims. Further embodiments also addressing the objectives listed above are stated in the dependent claims.

The implant provided by the invention is a dental implant for preserving soft tissue and promoting bone growth. It comprises an elongated implant body having a coronal end and an apical end, an external thread, and a helical flute. The apical end of said implant forms a blunt tip. The helical flute spirals in opposite direction to the external thread and the flute exits on the face of the blunt tip. More specifically, the helical flute spirals in opposite direction to the external thread and the flute tapers off on the face of the blunt tip.

While the implant according to the invention is screwed into the implantation site, the helical flute collects bone tissue that is cut off during insertion as bone debris. This bone debris is transported in the direction of insertion to deposited in the apical periphery of the implant in order to promote bone augmentation and bone repair, i. e. the healing reaction taking place post-operative.

Since the flute exits on the blunt tip facing in the longitudinal direction away from the implant, excessive bone debris can be discarded into the space in front of the implant. This space may be an implantation hole prepared prior to insertion of the implant or may be a space created on the side of the bone lying opposite to the entry side of said implant (also referred to as posterior side of the bone).

Further, the tip of said implant being blunt prevents piercing or damaging of soft issue located in front of the apical end of said implant. Thus, the implant has the advantage that it does not damage the soft tissue when exiting the posterior side of the bone, such as the maxillary sinus.

In another embodiment, the flute of said dental implant may have a coronal flank and an apical flank, wherein the coronal flank provides a cutting edge.

Since the coronal flank of the helical flute provides a cutting edge, the cutting edge is significantly longer than the cutting edges commonly known from the prior art. This is also due to the helical flute spiraling in opposite direction to the external thread. Besides providing a self-tapping feature, this also facilitates cutting bone tissue off the inner wall of an implantation hole in order to increase its diameter, thereby collecting an increased amount of bone debris within said flute.

In another embodiment of the implant, the angle as measured in the longitudinal cross section of the implant between the coronal flank and a normal to the longitudinal axis of said implant is between 1° and 5°, preferably between 2° and 3°.

Thus, the coronal flank has an inclination away from the longitudinal axis of the implant in the direction of the apical end. The coronal flank being tilted in such a way facilitates cutting of the bone tissue and subsequently moving the bone tissue into the depths of the flute toward the center of the implant.

In yet another embodiment, the dental implant comprises a flute base between the coronal flank and the apical flank of the flute. Preferably, the flute base is inclined toward the longitudinal axis in the direction of the coronal end.

The flute base being inclined as defined allows for a more reliable collection of bone debris on the coronal flank. In other words, bone debris will be directed toward the coronal flank while inserting the implant into the bone.

In a preferred embodiment of the present invention, the flute has a greater depth than the thread, preferably 40% to 200%, more preferably 60% to 150%.

Since the depth of the flute is greater than the height of the thread, bone tissue that overlaps with the final position of the implant is cut off, which increases the amount of bone debris that may serve to help augmenting bone tissue in the periphery of the implant. In other words, the depth of the flute being greater than the depth of the thread ensures that the cutting edge of the coronal flank of the flute also runs along the root of said external thread.

In another preferred embodiment, the pitch of the flute is equal or larger than the pitch of the external thread.

This configuration results in the bone debris being at least partly moved relative to the implant in the direction of insertion, which results in improved bone augmentation properties of the implant, particularly in its apical periphery.

In another embodiment, the dental implant is provided with at least two helical flutes.

Incorporating more than one helical flute in the design of the dental implant has the effect that cutting forces during insertion of the implant are basically symmetrical. This facilitates inserting the implant along its longitudinal axis.

In another preferred embodiment, the thread extends beyond the flute in the coronal direction.

Thus, the coronal end of the implant located at the entry of the implantation hole provides a press fit that is not affected by the flute.

In a further embodiment, the implant body includes a coronal section and an apical section, the coronal section and the apical section separated by a knee, wherein at least the apical section is tapered toward the apical end.

This allows to cut off an increased amount of bone debris and increasing the diameter of the implantation hole in the apical section, wherein the main objective of the coronal section is to provide primary stability to the implant after implantation by press-fitting the implant at the coronal section into the implantation hole.

In a further embodiment, the cone angle of the coronal section is less than the cone angle of the apical section.

In this embodiment, the apical section as well as the coronal section generally has a frusta-conical shape. The apical section primarily provides bone debris, whereas the coronal section is adapted to increase the press fit between the dental implant and the surrounding bone tissue, in particular the cortical bone of the alveolar arch. More specifically, the cutting depth of the coronal section is less than in the apical section so that the increase in the implant's diameter tends to compress the surrounding bone tissue rather than to cut it off.

In yet another embodiment of the present invention, the self-tapping flute and thread arrangement starts at the apical end and expands to its greatest height at the knee.

Besides providing more bone debris due to the increasing height of the flute and thread, this also results in the availability of a high pulling force of the thread for providing the press-fit during primary stability.

In a further embodiment, the width of the thread between one root to the next root may increase toward the coronal end.

Besides providing more bone debris, this may also provide an increased press fit at the coronal end of said implant, in particular after the cutting flute tapered off in the coronal direction. The increased width of the thread provides for additional compression of bone tissue causing an increase of the press fit force.

In yet another embodiment, the blunt tip includes a curved protrusion formed at the apical end, the protrusion preferably being symmetrical.

Designing the blunt tip of the dental implant as a curved protrusion has on the one hand the advantage that the integrity of soft tissue in contact with said tip is protected and on the other hand makes it easier to displace bone tissue that is located in front of the implant in the direction of insertion in case the implant reaches the base of the implantation hole but should pass on to the posterior side of the bone.

In yet another embodiment, the implant includes a prosthetic interface at its coronal end.

Including an interface at the coronal end of the implant provides for a wide range of possible restoration techniques known from the prior art.

In a further embodiment of the present invention, at least one of the flank, the external thread and the flute comprises at least one groove.

These grooves have been shown to be advantageous for securing the implant in the bone tissue since they promote bone growth, in particular for long term stabilization after the effect of the press fit decreases due to bone remodelling.

The invention also provides an implant system, comprising a dental implant according to this invention and a prosthesis.

Such an implant system provides the necessary tool for a professional to adapt the restoration technique of the denture in order to individually respond to the needs of each patient.

In an embodiment of the implant system, the prosthesis comprises at least one of an abutment, an abutment screw, a bridge, and a prosthetic tooth.

Further, the invention provides a method for implanting a dental implant according to any one of claims 1 to 15, comprising the following steps: performing an incision into the gingival tissue, where the implant is to be placed; drilling an implantation hole into the alveolar arch; placing the implant in the hole and screwing the implant into the alveolar arch until the blunt tip of the implant touches the mucous membrane covering the maxillary sinus on the side opposite to where the entry of the implantation hole is located; providing a void space between the maxillary sinus floor and the mucous membrane; supporting the mucous membrane with the blunt tip of the implant; at least partly filling the void space with bone debris (85); and sealing the incision.

As a result of this method, implantation of the final implant as well as bone augmentation may be achieved in only one procedure. Further, the mucous membrane is left intact and provides for a protected void space in the maxillary sinus, in which bone augmentation may take place without being adversely affected. Further, the bone augmentation using the implant of the present invention may only be based on autologous bone tissue that is transported during insertion of the implant into the void space between the maxillary sinus floor, and the mucous membrane.

In another embodiment of the method, the hole is a blind hole having a diameter at its entry that allows the blunt tip of the implant to enter until an apical flank of the external thread touches the alveolar arch.

Preparing the hole in such a way allows for cutting off bone debris immediately after starting to screw in the implant.

In yet another embodiment, the flute provides bone debris to the void space in front of the implant when the implant is screwed into said alveolar arch.

Although additional tissue may be provided to the void space, it is preferred to only use bone debris that has been transported by the flute of the implant into the space while being inserted into said implantation hole in order to fully use the advantages of autologous bone tissue.

In a further embodiment of the invention, the method comprises the step of placing a prosthesis on said implant.

By placing the prosthesis on said implant, the treatment, probably after a defined healing period, is finalized.

DESCRIPTION OF THE DRAWINGS

In the following features that have similar characteristics or are directed to similar functions are designated with associated reference numbers.

DESCRIPTION OF PREFERRED EMBODIMENTS

Figure 1A:
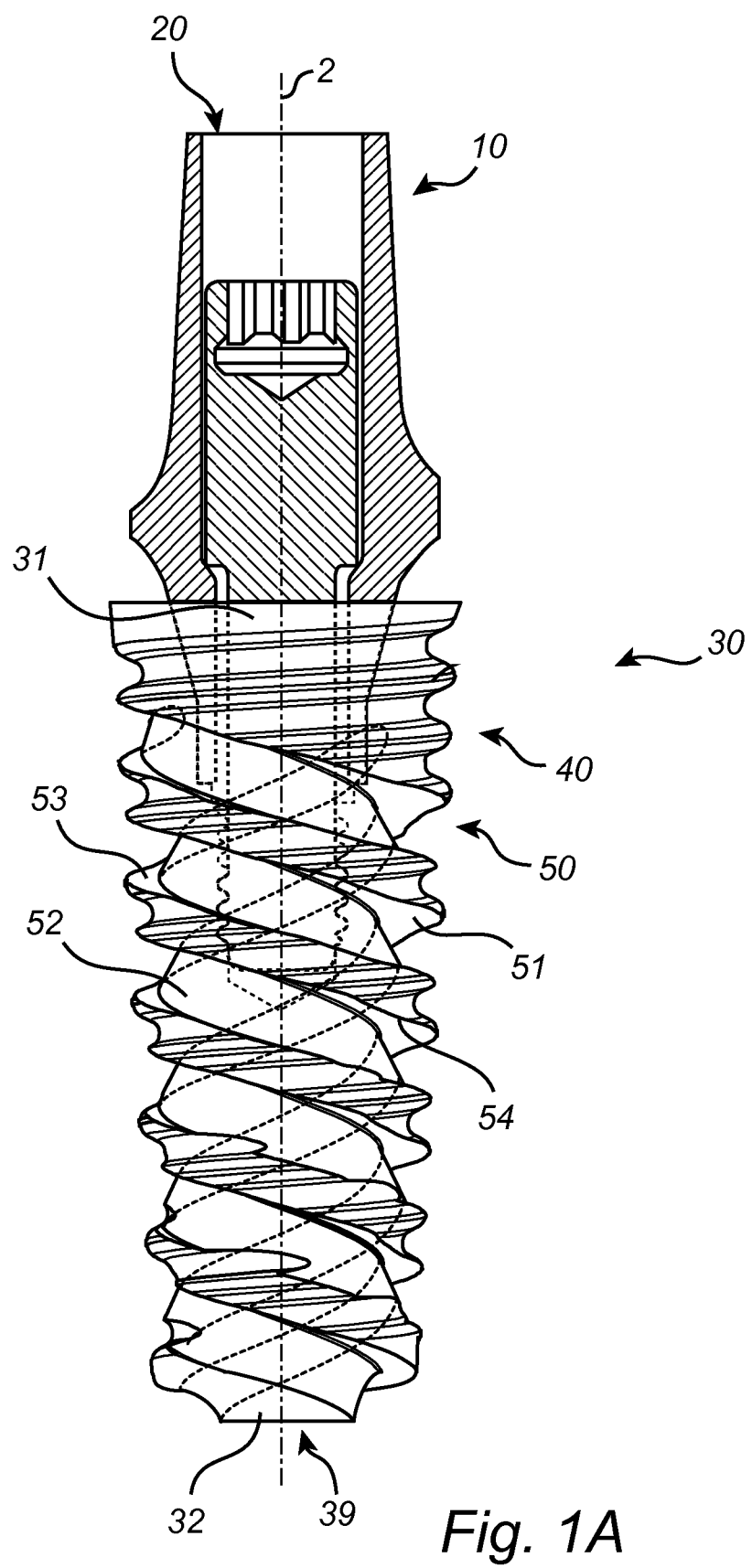
FIG. 1A is a side view of an implant system comprising a dental implant according to one embodiment of the invention.

FIG. 1A shows an implant system comprising an abutment 10, an abutment screw 20, and a dental implant 30 according to the invention. However, the abutment 10 and the abutment screw 20 may be replaced by any other prosthetic components of the art.

The dental implant 30 of FIG. 1A substantially has a frusta-conical shape. This general shape is merely one of the preferred general shapes of the invention as will be seen below (e. g. FIGS. 4A-4C, and FIGS. 5C-5E).

The body of the implant 30 comprises a coronal end 31 and an apical end 32. At the coronal end 31 there is an interface 160 (cf. FIG. 2) for mounting prosthetic components, such as an abutment and an abutment screw 20. For, example an interface to a prosthetic component as defined in U.S. Pat. No. 6,733,291 B1, US 2011/0020767 A1, US 2012/0021381 A1, U.S. Pat. No. 8,038,442 B2 or U.S. Pat. No. 4,960,381 A may be included.

At the apical end 32, the implant 30 is provided with a blunt tip 39.

The dental implant 30 is provided with an external thread 40, starting at the apical end 32 and spiraling along the outer side of the implant 30 toward the coronal end 31. The thread profile of the external thread 40 may change along the length of the implant 30. At the apical end 32 the thread profile may have a reduced thread depth compared to the thread profile at the coronal end 31. In between, the thread depths gradually increase. Such a thread geometry combined with the helical flute is one way to provide the implant 30 with a self-tapping feature.

The thread 40 shown in FIG. 1A is a double thread. Alternatively, one, three or four threads may be provided along the outer side of dental implant 30. However, preferably, a double thread is used.

Two or more threads have an advantageous effect on the characteristics of the implant 30. More specifically, by using a plurality of threads 40 along the implant 30, the risk of misalignment while screwing in the implant 30 is significantly reduced. For example, the double thread 40 enters the bone tissue symmetrically so that even in the beginning of insertion, the center of rotation of the implant 30 is practically identical to the longitudinal axis 2 of the implant 30. Consequently, the likelihood of tilting of the implant 30 during insertion is reduced.

Further, two or more threads 40 also provide for a symmetric loading of the bone tissue while tightening the implant 30. The bone tissue also experiences less wear since, for example, the lead of a double thread 40 is greater than the pitch of a single thread 40 so that less length of the thread's flank is passing by the entry point at the implantation hole 86 in FIG. 5B. For the sake of simplicity, the term pitch is used in the following for the distance between two crests of a single thread as well as for the distance between two crests belonging to the same thread of a. double thread.

At the apical end, the implant 30 includes a blunt tip 39. The blunt tip 39 is formed so that soft tissue in contact with said tip 39 is not damaged or pierced.

An implant according to the present invention is also provided with at least one helical cutting flute 50 spiraling in the opposite direction to the external thread 40. The cutting flute 50 comprises a coronal flank 51, an apical flank 53 and a flute base 52 connecting the inner edges of the apical flank 53 and coronal flank 51. It will be appreciated that the profile of the cutting flute may be at least partly curved. Further, the flute base 52 may merge with either of the coronal flank 51 or the apical flank 53. In another embodiment, the coronal flank 51 may directly connect to the apical flank 53 at a point closest to the longitudinal axis 2. However, in all of these configurations, the coronal flank 51 constitutes a cutting edge 54 and will act as cutting flank.

Preferably, the coronal flank 51 is longer (as seen from the side) than the apical flank 53. As a result, the flute base 52 in FIG. 1A is not running parallel to the longitudinal axis 2 of said implant 30. Instead, the flute base 52 is inclined toward the central axis 2 in the direction of the coronal end 31. In other words, the depth as measured from the outer side of implant 30, i. e. the envelope surface of implant 30, of said flute base 52 decreases from the coronal end 31 to the apical end 32.

As can be seen in FIG. 1A, the cutting flute helically runs from the apical end portion 32 along the outer side of implant 30 toward the coronal end 31 and preferably ends at a height so that at least one crest of thread 40 as seen in the longitudinal cross-section along the central axis 2 remains. However, preferably, two crests of thread 40 along the outer side of implant 30 remain in the coronal direction along central axis 2 after tapering off of the helical flute 50.

Further, the helical flute 50 preferably circumvents the implant 30 at least twice. The pitch of the flute shall be within the interval 2-4 pitches of the thread, preferably 2.5-3.5 thread pitches.

At the apical end portion 32, the helical flute 50 preferably exits within the blunt tip portion 39. In other words, the helical flute 50 opens up at the blunt tip portion 39 facing away from the implant 30 in its longitudinal direction (cf. FIG. 3B). The edges formed between the helical flute 50 and the blunt tip 39 may be chamfered or rounded.

There may be only one helical flute 50 provided along the implant 30. However, preferably, there is more than one flute 50 provided along the implant 30. It has been found that an advantageous number of flutes, spiraling in opposite direction to the external thread(s) 40 and symmetrically distributed around the longitudinal axis, is two.

The cutting flute spirals along the outer side of implant 30 in the opposite direction to the external thread 40. Thus, the flute 50 intersects the external thread 40. This intersection with the external thread 40 causes the coronal flank 51 to form a cutting edge 54. Said cutting edge 54 enables the external thread 40 to be self-tapping.

Cutting is performed at the cutting edge 54 belonging to the coronal flank 51, the coronal flank 51 being longer than the apical flank 53. In order to provide a cutting edge 54 that runs along the whole cross-section of the external thread geometry, the cutting flute 50 needs to have a higher depth than the external thread 40. Preferably, the flute has an at least 40% to 200% greater depth than the depth of the external thread 40. Consequently, the depth of the apical flank 53 has to be at least 40% deeper than the depth of thread 40.

Moreover, two cutting flutes have one advantage that their symmetric configuration provides for a symmetric distribution of cutting forces that are caused by the cutting edge while creating the female thread in the surrounding bone tissue.

The cutting flute 50 spiraling along the implant also has the advantage, that the length of the cutting edge 54 is increased in comparison to cutting flutes known from the prior art that commonly run along the implant's longitudinal direction. Such an increased length of the cutting edge 54 provides for an even distribution of cutting forces and a more equal distribution of cut off bone tissue as well as its collection in the helical flute 50.

Figure 1B:
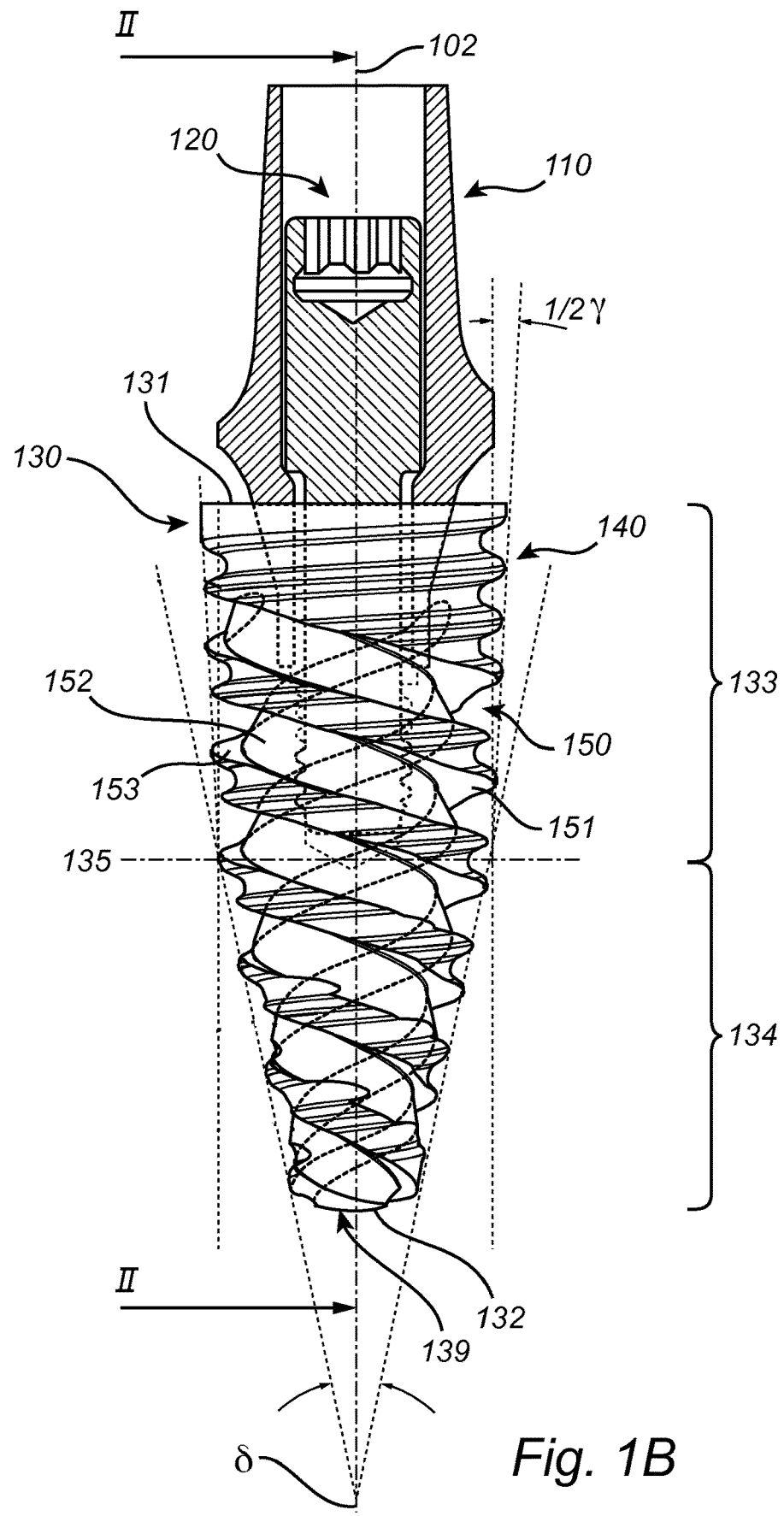
FIG. 1B is a side view of an implant system comprising a dental implant according to another embodiment of the present invention.

Preferably, and as seen in FIGS. 1A and 1B, the lead of the cutting flute 50, 150 is higher than the lead of the external thread 40, 140, respectively. Since the lead of the flute 50, 150 is higher than the lead of the external thread 40, 140, at least parts of the bone debris is transported a shorter distance, relative to the direction of insertion, than the implant 130 itself. More specifically, bone tissue is cut off by the cutting edge and is subsequently being positioned within the flute 50, 150. However, the cut off bone tissue is at least not fully attached to the cutting flute 50, 150 but, instead, will tend to move in the apical direction of the implant 30, 130. Consequently, the bone debris will be transported toward the apical end 31, 131 of said implant 30, 130 during insertion of the implant.

The hole prepared for implantation of said implant 30 has at least a diameter that allows the implant 30 to be inserted partly into the bone tissue until the surrounding rim of the implantation hole touches the apical flank of the thread 40.

At the apical end of the implant in FIG. 1A, the blunt tip 39 is generally formed as a plane surface facing away from the implant in the longitudinal direction. Naturally, it is within the scope of the invention to replace the flat surface with a curved protrusion such as the one shown in FIG. 3. Such a rounded tip also provides protection to soft tissue such as the mucous membrane.

Further, having the tip rounded, increases the support for the mucous membrane when the implant enters into the sinus. In other words, the blunt tip in its rounded configuration does not only support the mucous membrane for creating or maintaining the space provided between the sinus floor and the mucous membrane but is also adapted to the shape of the membrane under tension. In a nutshell, the implant with its blunt tip acts like a post for a tent.

The implant 30 of FIG. 1A has a frusta-conical shape that is tapered toward its apical end 32. Such a shape makes it possible to continuously cut off of bone tissue along the outer side of the implant 30. More specifically, the diameter of the implantation hole prepared prior insertion of the implant is preferably chosen to be as small as possible. This allows the implant 30 to be inserted with its blunt tip until the self-tapping thread 14 of the implant 30 contacts the circumferential rim of the implantation hole. In this way, the hole provides for an initial guidance of the implant into the implantation hole.

Subsequently, cutting of the bone tissue starts upon screwing the implant into the implantation hole. As will be appreciated, the conical form of the implant 30 results in the cutting edge 54 not only cutting the thread geometry but at the same time increasing the diameter of the prefabricated implantation hole. Thus, the implant 30 may also acts like a drill during implantation, in particular if the depth of the flute 50 is higher than the height of the external thread 40.

Preferably, the implant exits the bone and enters into the maxillary sinus. In other words, the implant 30 may pass through the bone. However, upon exiting the bone, the soft membrane covering the bone inside the maxillary sinus should not be damaged. This is achieved by providing a blunt tip 39 to the implant 30. Moreover, it is realized that alternative procedures are using an implant in accordance with the present invention. Furthermore, it is realized that elevating the membrane prior to the insertion of the implant through a fenestration 87 may serve to reduce the risk for soft membrane to be damaged during the procedure. A method following such a principle is disclosed in FIG. 6a-6f. It is acknowledged that according to a presently preferred method the membrane is elevated prior to inserting the implant. The blunt tip of the implant minimizes the risk that the membrane is perforated after insertion of the implant.

Since bone debris from expanding the hole as well as cutting the thread 40 is collected in the flute 50, it will at least partly be moved toward the exit of the hole into the maxillary sinus, i. e. by the flute tapering off the front face of the blunt tip as well as by the part of the flute that extends beyond the hole in the bone, i.e. the in the maxillary sinus.

The void created between the sinus floor and the mucous membrane is thereby partly filled with bone tissue, which enhances the formation of new bone and, thus, improves the stability of the implant. In particular, the dental implant of the present invention may be used in patients, in which it is of advantage to use bone augmentation for providing an improved stability within the bone tissue.

Now referring to FIG. 1B, another embodiment of the implant similar to the one shown in FIG. 1A is disclosed. In this respect, features, advantages and effects previously described for the dental implant of FIG. 1A also apply to the implant of FIG. 1B. Further, features corresponding to features of the previous embodiment are denoted with associated reference numbers, i. e. the reference numbers have been increased by multiples of one hundred. This also applies to all other embodiments described below. For example, the previously described features of the flute 50 also apply to the flute 150 of the present embodiment as well as to, for example, flute 350 of FIG. 3. Likewise, the structural features and their modifications described for the external thread 40 also apply to the external thread 140 or 440 (see FIG. 5C).

The embodiment of the dental implant 130 shown in FIG. 1B comprises a coronal section 133 and an apical section 134. The coronal section 133 is frusta-conical but may also be cylindrical. On the other hand, the apical section 134 is designed to be frusta-conical in order to accumulate bone tissue in the form of bone debris to be subsequently used for bone augmentation, preferably in the apical periphery of implant 130. Between the coronal section 133 and the apical section 134, there is a knee 135 due to a difference in cone angles $\delta$ and $\gamma$ of the apical section 134 and the coronal section 133, respectively. As shown in FIG. 1B, the cone angle $\delta$ of the apical section 134 is greater than the cone angle $\gamma$ of the coronal section 133.

As a result, besides cutting the female thread into the surrounding bone tissue, the apical section 134 also serves to increase the diameter of the implantation hole. In contrast, the coronal section 133 is primarily intended for providing primary stability by creating a press fit. In other words, the bone tissue is compressed in order to generate a press fit between the surface of the thread 140 and the surrounding bone tissue. This may be achieved by letting the flute 150 start to taper off after crossing the knee 135 in the coronal direction. The key is to have the flute extending all the way to the blunt tip for discharging of bone debris and the tapering may be used to facilitate discharging into the maxillary sinus void.

However, preferably, the flute 150 extends beyond the knee up to the second last thread of the external thread 140 as seen in the longitudinal cross-section along the central axis 102.

Preferably, the final geometry of the external thread 140 is reached at the height of the knee 135. This may also solely apply to the height of the thread flanks (see FIG. 2). However, the width of a thread between a thread root and an adjacent thread root may well increase starting from the apical end 132 beyond the knee 135, even up to the coronal end 131. Such a design of the external thread 140 additionally provides primary stability of the implant. More details concerning the geometry of such a thread may be taken from NobelActive U.S. Pat. No. 8,038,442 B2 and US 2012/0021381.

Figures 3A, 3B:
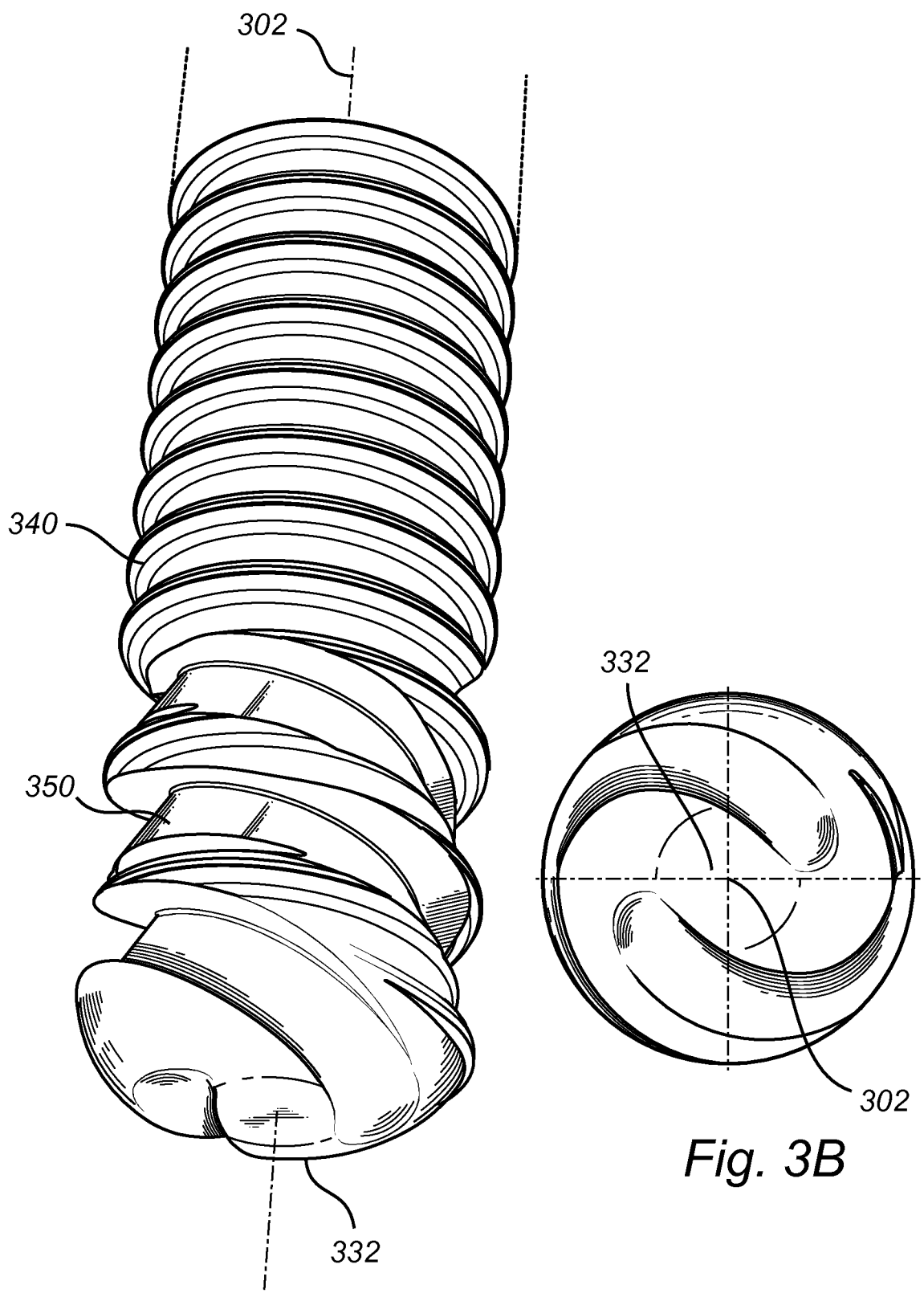
FIG. 3A is a side perspective view of another embodiment of a dental implant according to the invention.
FIG. 3B is a plan view on the apical end of the embodiment of the dental implant shown in FIG. 3A.

Turning now to FIG. 3B, a front view of a blunt tip is shown. This embodiment of a blunt tip is formed by a curved protrusion at the apical end 332 of the implant 330. The cutting flute(s) 350 exit(s) at the blunt tip of the implant 330. Hence, bone debris may be transported out of the apical end of the flute, for example into a void space between the sinus floor and the sinus membrane.

Figure 2:
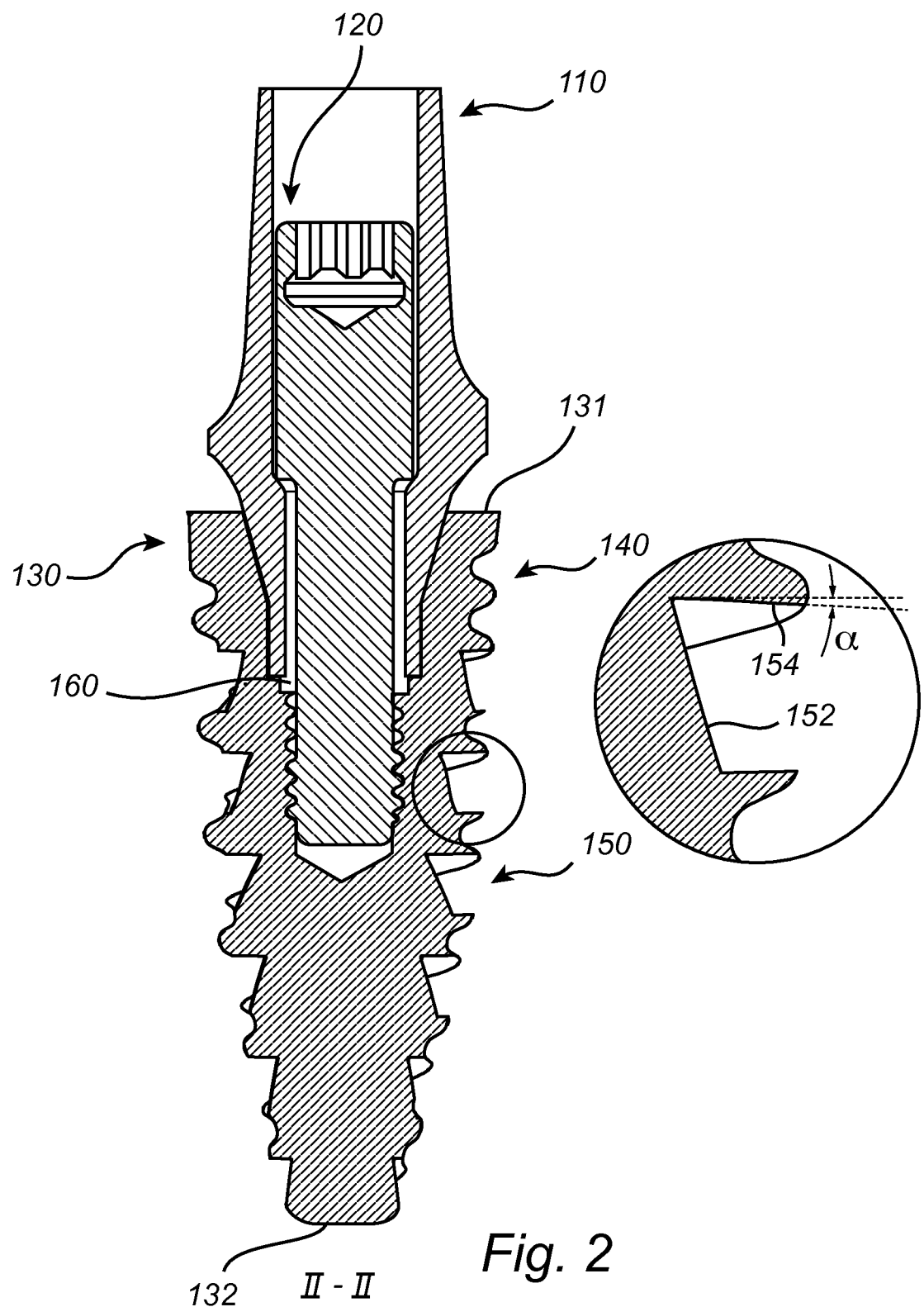
FIG. 2 is a cross-section of the implant system in the longitudinal direction along intersection line II-II of FIG. 1B.

FIG. 2 shows a longitudinal cross-section of implant 130 along the line II-II shown in FIG. 1B. As depicted in the detail of FIG. 2, the coronal flank with the cutting edge 154 is tilted by an angle α about the normal to the longitudinal axis of the implant. Thus, bone tissue cut by the cutting edge 154 propagates in the direction of the flute basis 152 while bone is cut off the circumferential wall of the implantation hole during insertion of the implant 130.

Figures 4A, 4B, 4C:
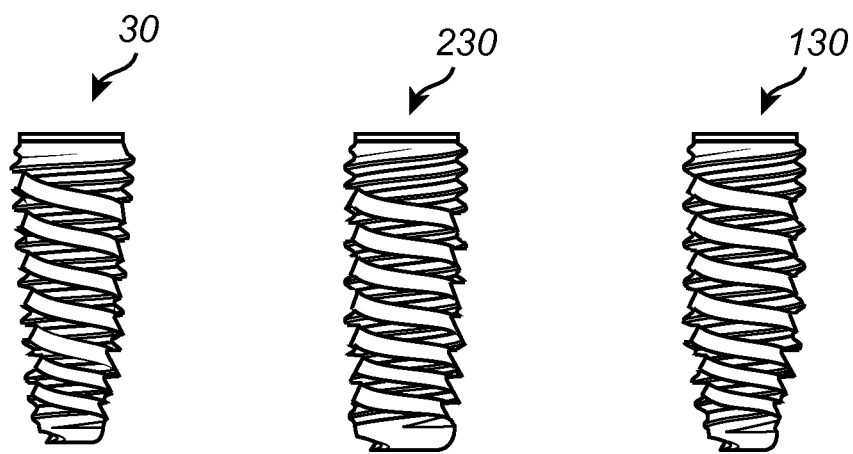
FIG. 4A is another side view of the first embodiment of the dental implant according to the invention.
FIG. 4B is a side view of a third embodiment of a dental implant according to the invention.
FIG. 4C is another side view of the second embodiment of a dental implant according to the invention.

FIGS. 4A to 4C show different shapes applied to the dental implant. The embodiment shown in FIG. 4A corresponds to the embodiment shown in FIG. 1A. In this embodiment, the coronal as well as the apical section have the same cone angle so that the whole implant 30 substantially has a frusta-conical shape. In contrast, implant 230 shown in FIG. 4B is designed to be basically cylindrical along its length. Further, the embodiment of FIG. 4C shows another side view of the implant 130 of FIG. 1B and FIG. 2.

In the following, a procedure for implantation of an implant according to the invention will be described in more detail.

Figure 5A:
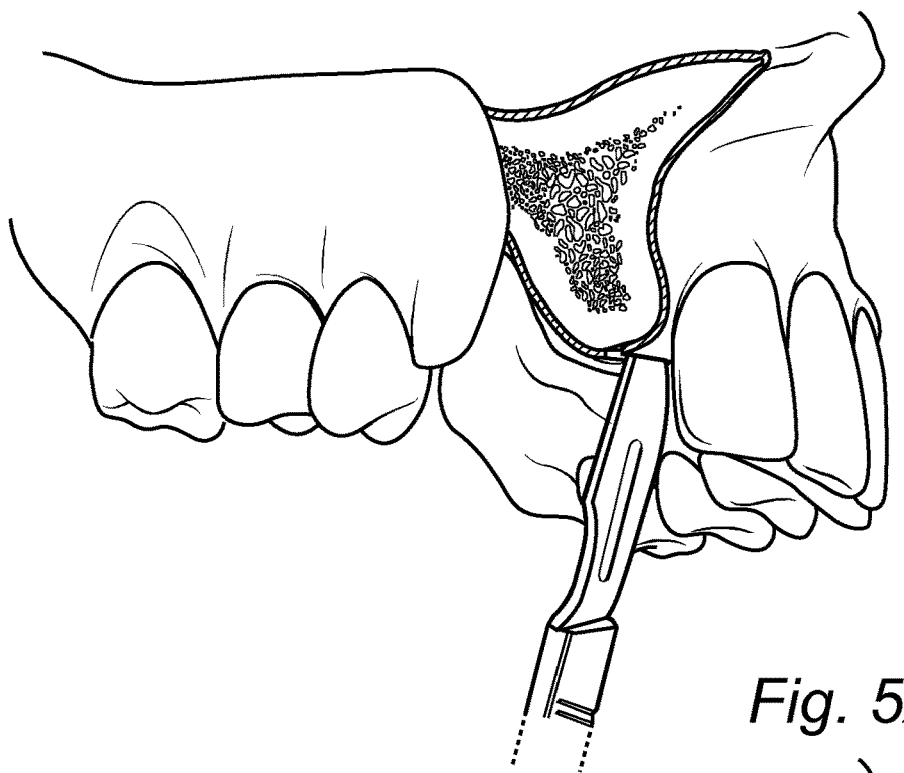
FIG. 5A is a perspective view of the implantation site when accessing the alveolar arch.

In FIG. 5A, an incision is made into the gingival tissue exposing the underlying bone where a hole for implantation shall be drilled.

Figure 5B:
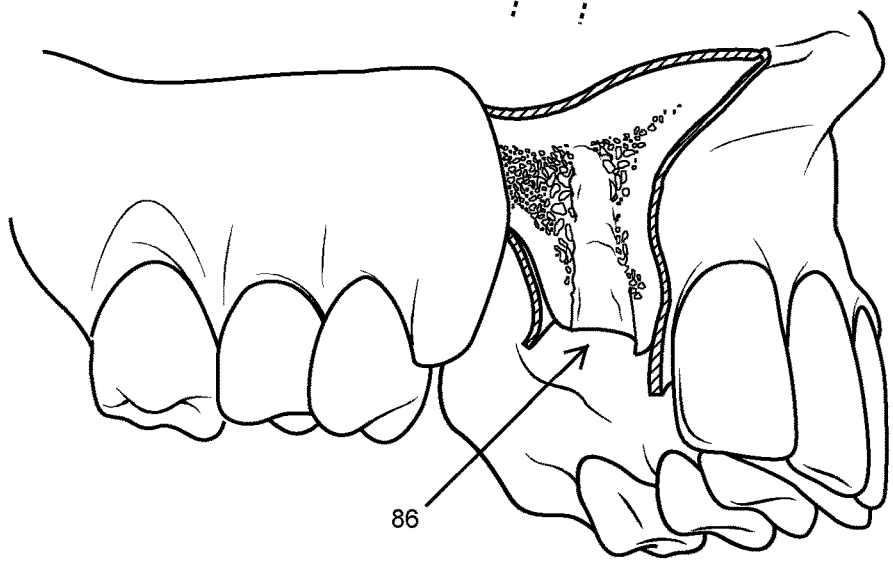
FIG. 5B is a perspective view of the implantation site of FIG. 5A during preparation of an implementation hole.

In FIG. 5B a drill 70 is used to drill the implantation hole 86. Although the drill 70 in FIG. 5B is depicted as a step drill, a drill without a step may also be used. Preferably, the implantation hole 86 is not prepared as a through hole during the drilling step in order to prevent the mucous membrane located on the posterior side of the alveolar arch from being damaged. However, a drill that does not damage soft tissue may be used to create the implantation hole 86 as a through hole extending throughout the alveolar arch.

Figure 5C:
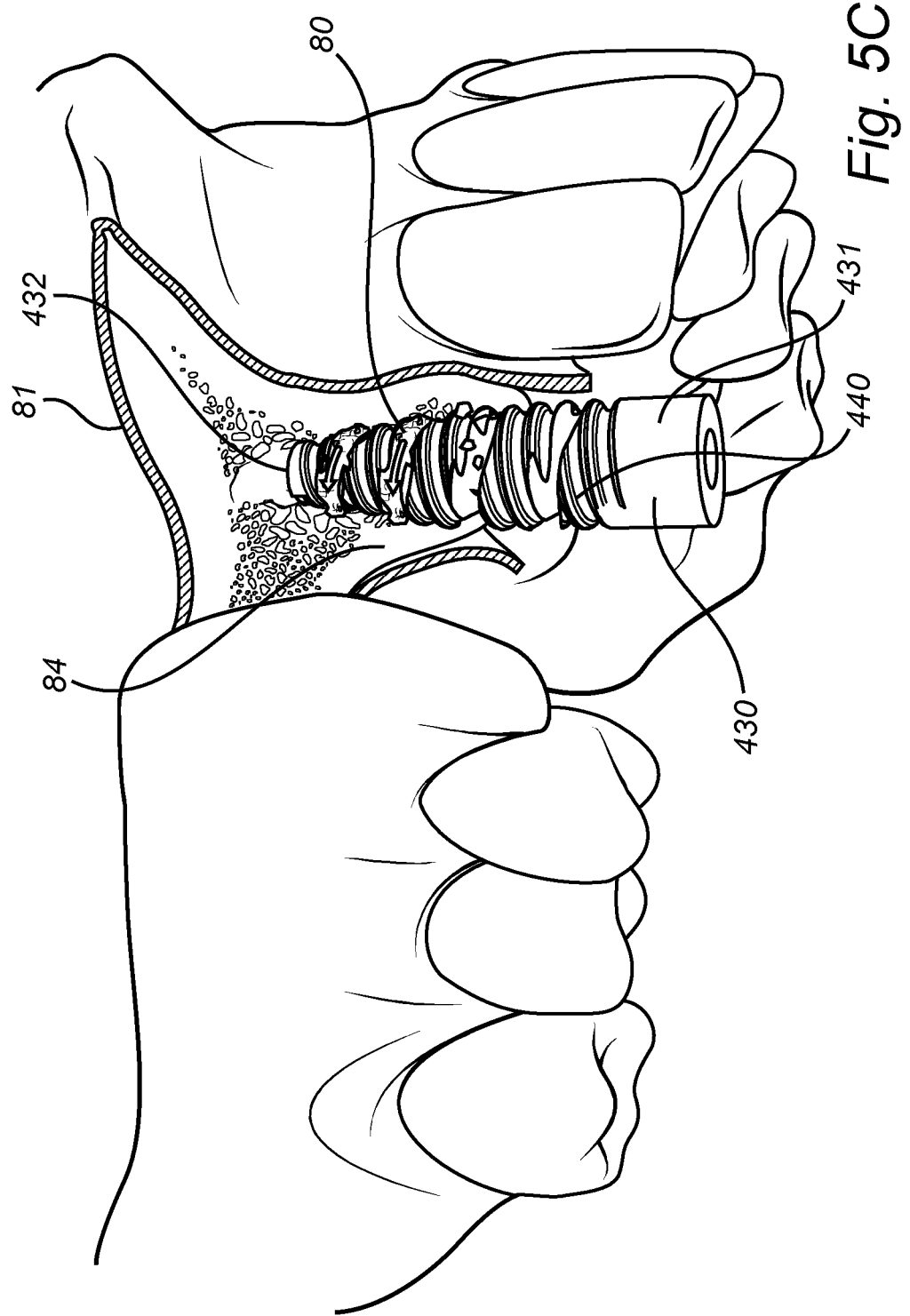
FIG. 5C is an enlarged perspective view of the implantation site showing the screwing action of a dental implant according to this invention.

FIG. 5C shows the insertion of an implant 430 according to the present invention. Naturally, any of the other embodiments described above may be used instead. Since the implantation hole 86 is undersized compared to the diameter of implant 430, the coronal flank of the flute 450 cuts off bone debris 80 from the inner wall of implantation hole 86. As indicated by the arrow at reference sign 80, the bone debris 80 is urged along the helical flute towards the apical end 432 of implant 430 while said implant is screwed into the implantation hole 86.

Figure 5D:
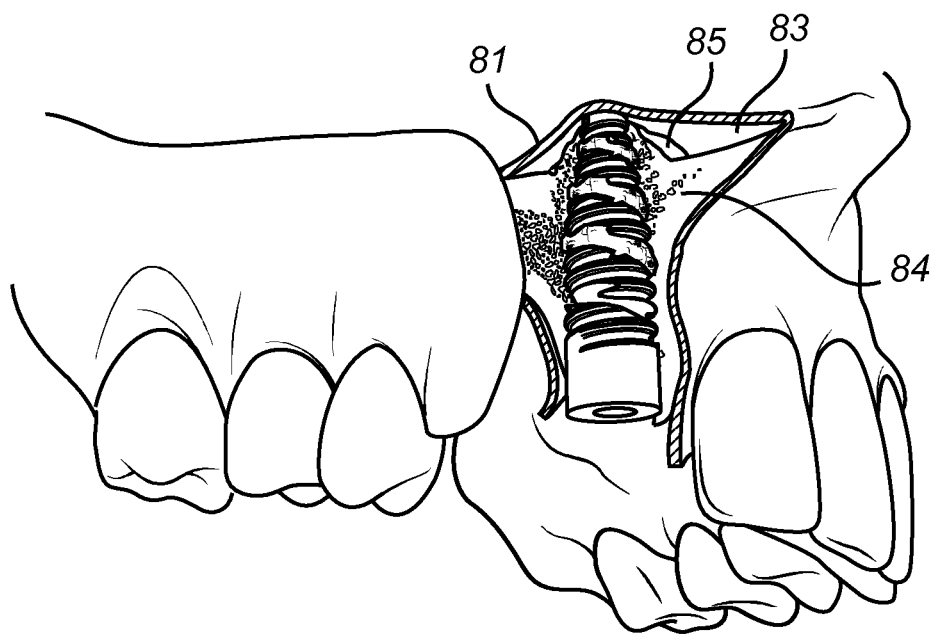
FIG. 5D is a perspective view of the implantation site showing the dental implant in its final position within the alveolar arch.
Figure 5E:
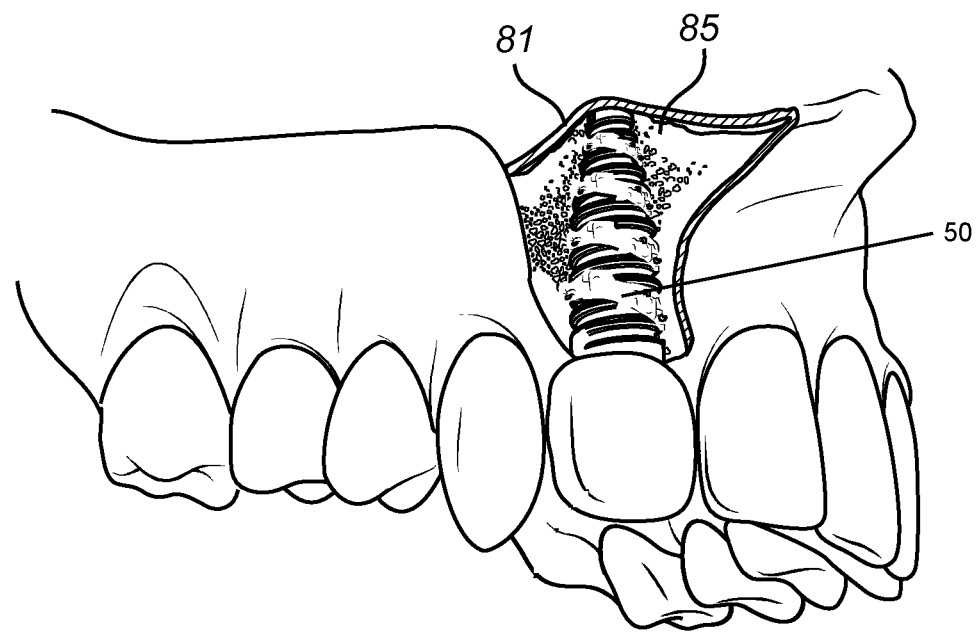
FIG. 5E is a perspective view of the implantation site after healing and installation of a dental prosthesis.
Figure 6A:
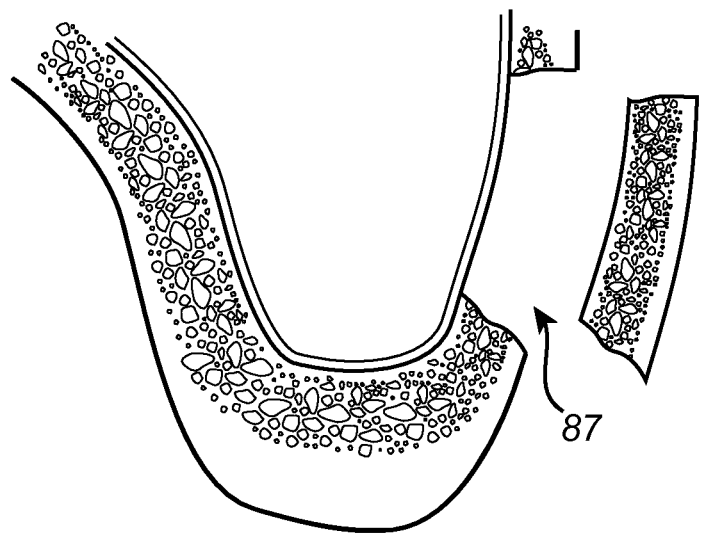
FIG. 6A is a cross-sectional view of the implantation site with a fenestration when accessing the alveolar arch.
Figure 6B:
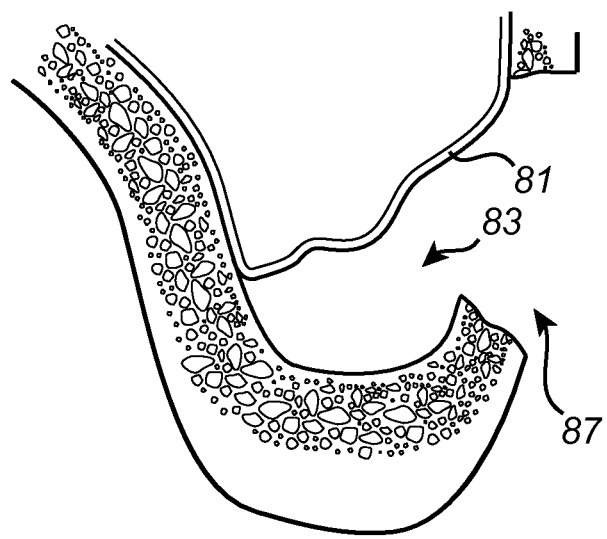
FIG. 6B is a cross sectional view of the implantation site after elevation of the maxillary sinus membrane.
Figure 6C:
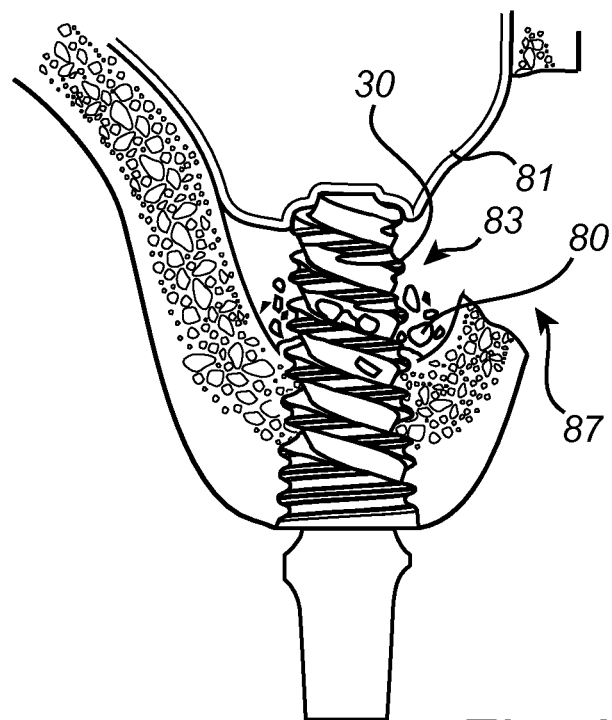
FIG. 6C is a cross sectional view of the implantation site of a dental implant in site after insertion through bone into the prepared compartment existing after the elevation of the sinus membrane.
Figure 6D:
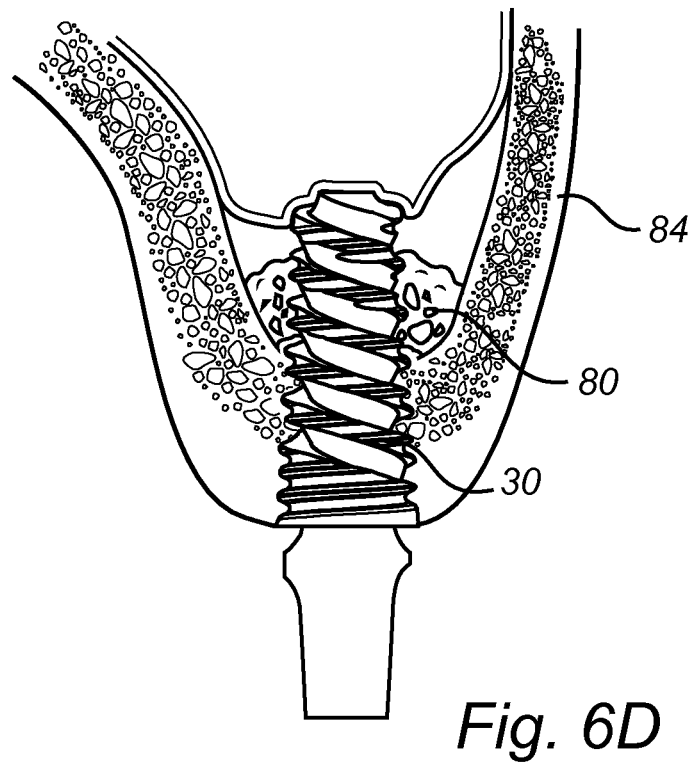
FIG. 6D is a cross sectional view of the implantation site showing the dental implant in its final position within the alveolar arch and the fenestration reinstated.
Figure 6E:
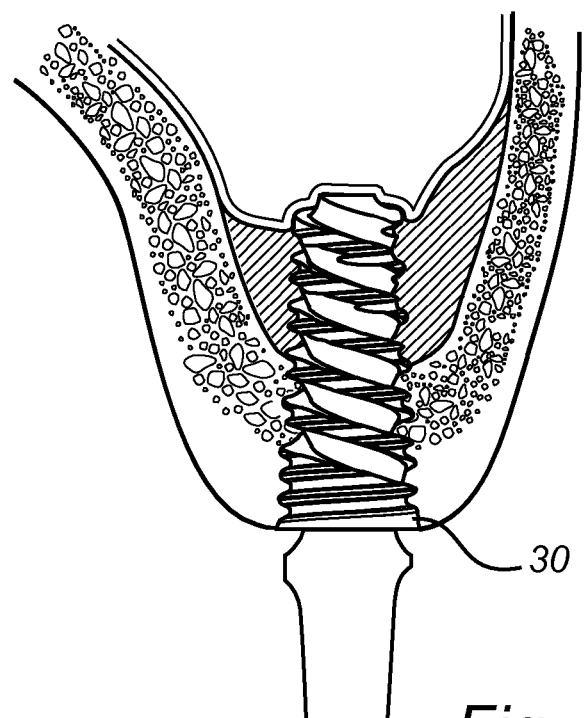
FIG. 6E is a cross sectional view of the implantation site during healing.
Figure 6F:
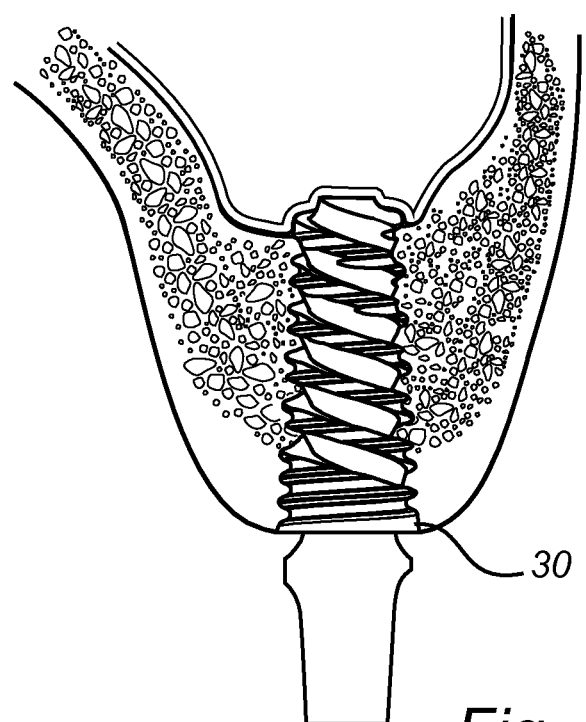
FIG. 6F is a cross sectional view of the implantation site after healing.

Turning to FIG. 5D, a void space 83 has been created by lifting the mucous membrane 81 above the surface of the alveolar arch 84. Since the bone debris on the sides of hole 86 is transported towards the apical end of implant 430, it enters the void space 83 by exiting the flute, where the flute arrangement 450 exits or at the part of the flute extending into said space 83. The accumulation 85 of the bone debris stimulates bone augmentation in the space between the sinus floor and the sinus membrane.

The sinus membrane 81 may have been lifted off the alveolar arch by screwing in the implant 430 or by any other means or technique known by the skilled person as exemplified in a previous section.

After implantation, the gingival tissue may be intermittently closed by fastening means, such as a suture or clamps, or by glue for an undisturbed healing process. Alternatively, an intermediate or a final prosthesis may be placed on said implant 430.

Once healed, prosthesis 90 may be attached to the anchored implant 430. As can be seen at reference sign 85 in FIG. 5D, bone augmentation has successfully been achieved without causing damage to the sinus membrane 81.

It will be understood by the skilled person that an implant according to the present invention may include at least one of a modified surface or a coating on at least part of its surface to enhance osseointegration. One example is the TiUnite® surface marketed by Nobel Biocare®.

As described above, the present invention provides a new generation of implant that may be applied in cases with insufficient bone quality or quantity. As will be understood by the person skilled in the art, the previous embodiments are intended for explanatory purposes only, whereas the scope of protection is defined by the following independent claims. Further combinations of features defining preferred embodiments are stated in the dependent claims.

The invention claimed is:

1. A dental implant for preserving soft tissue and promoting bone growth, comprising:
   an elongated implant body having a coronal end portion and an apical end portion;
   an external thread; and a flute arrangement having a depth,
   in which the apical end portion forms a blunt tip, and
   in which the flute arrangement comprises at least one helical flute spiraling in an opposite direction to the external thread, the at least one helical flute has a greater depth than the depth of the thread, the at least one helical flute exits on a face of the blunt tip, the at least one helical flute circumvents the dental implant at least twice,
   wherein the at least one helical flute has a coronal flank, wherein the coronal flank provides a cutting edge, wherein an angle as measured in the longitudinal cross section of the implant between the coronal flank and a normal to the longitudinal axis of said implant is between 1° and 5°;
   wherein the at least one helical flute has an apical flank and a flute base between the coronal flank and the apical flank of the flute arrangement, the flute base, as measured in the longitudinal cross section of the implant being inclined along a straight line in a longitudinal cross section of the helical flute and the flute base being inclined toward the longitudinal axis in the direction of the coronal end.

2. The dental implant according to claim 1, wherein the depth of the at least one helical flute is greater than the depth of the thread by 40% to 200%.

3. The dental implant according to claim 1, wherein the pitch of the at least one helical flute is equal or larger than the pitch of the external thread.

4. The dental implant according to claim 1, wherein the at least one helical flute comprises at least two helical flutes.

5. The dental implant according to claim 1, wherein the thread extends beyond the flute arrangement in the coronal direction.

6. The dental implant according to claim 1, wherein the implant includes a coronal section and an apical section, the coronal section and the apical section separated by a knee, wherein at least the apical section is tapered toward the apical end portion.

7. The dental implant according to claim 6, wherein a cone angle of the coronal section is less than a cone angle of the apical section.

8. The dental implant according to claim 6, wherein the external thread starts at the apical end portion, and wherein the external thread has its greatest height from the implant body at the knee.

9. The dental implant according to claim 1, wherein a height of a flank of the thread increases toward the coronal end.

10. The dental implant according to claim 1, wherein the blunt tip includes a curved protrusion formed at the apical end portion, the protrusion being symmetrical.

11. The dental implant according to claim 1, wherein the implant comprises a prosthetic interface at the coronal end portion.

12. The dental implant according to claim 1, wherein at least one of the external thread and the at least one helical flute comprises at least one groove.

13. Implant system, comprising:
a dental implant according to claim 1, and at least one prosthesis.

14. The implant system according to claim 13, wherein the prosthesis comprises at least one of an abutment, an abutment screw, a bridge, a bar and a prosthetic tooth.

15. Method for implanting a dental implant according to claim 1, comprising the steps:
performing an incision into the gingival tissue, where the implant is to be placed;
drilling an implantation hole into the alveolar arch;
placing the implant in the hole and screwing the implant into the alveolar arch until the blunt tip of the implant touches the sinus membrane covering the sinus floor on the side opposite to where an entry of the implantation hole is located;
providing a void space between the sinus floor and the sinus membrane;
supporting the sinus membrane with the blunt tip of the implant;
at least partly filling the void space with bone debris; and
sealing the incision.

16. The method according to claim 15, wherein the hole is a blind hole having a diameter at an entry of the blind hole that allows the blunt tip of the implant to enter until an apical flank of the external thread touches the alveolar arch and screwing of the implant may begin.

17. The method according to claim 15, wherein the flute arrangement provides bone debris to the void space when the implant is screwed into said alveolar arch.

18. The method according to claim 15, further comprising the step of placing a prosthesis on said implant.

19. A dental implant for preserving soft tissue and promoting bone growth, comprising:
an elongated implant body having a coronal end portion and an apical end portion;
an external thread; and a flute arrangement having a depth,
in which the apical end portion forms a blunt tip, and
in which the flute arrangement comprises at least one helical flute spiraling in an opposite direction to the external thread, the at least one helical flute has a greater depth than the depth of the thread, the at least one helical flute exits on a face of the blunt tip, the at least one helical flute circumvents the dental implant at least once,
wherein a pitch of the flute is different from a pitch of the thread, wherein the at least one helical flute comprises a flute base and a coronal flank with a straight portion positioned coronally of the flute base, the flute base, as measured in the longitudinal cross section of the implant, being inclined toward the longitudinal axis in the direction of the coronal end, the flute base being inclined along a straight line in a longitudinal cross section of the helical flute.

20. The dental implant according to claim 19, wherein the depth of the at least one helical flute is greater than the depth of the thread by 40% to 200%.

21. The dental implant according to claim 19, wherein the pitch of the at least one helical flute is larger than the pitch of the external thread.

22. The dental implant according to claim 19, wherein the coronal flank provides a cutting edge, wherein an angle as measured in the longitudinal cross section of the implant between the coronal flank and a normal to the longitudinal axis of said implant is between 0° and 5°.

23. The dental implant according to claim 19, wherein the implant includes a coronal section and an apical section, the coronal section and the apical section separated by a knee, wherein at least the apical section is tapered toward the apical end portion.

24. The dental implant according to claim 19, wherein the implant comprises a prosthetic interface at the coronal end portion.

25. The dental implant according to claim 19, wherein at least one of the external thread and the at least one helical flute comprises at least one groove.

26. Implant system, comprising:
a dental implant according to claim 19, and at least one prosthesis.

27. The implant system according to claim 26, wherein the prosthesis comprises at least one of an abutment, an abutment screw, a bridge, a bar and a prosthetic tooth.

28. The dental implant according to claim 19, wherein a height of a flank of the thread increases toward the coronal end.

29. The dental implant according to claim 19, wherein the blunt tip includes a curved protrusion formed at the apical end portion, the protrusion being symmetrical.

* * * * *